March 5, 1963  R. MINER, JR  3,079,693
DIAL INDICATOR EXTENSION ATTACHMENT
Filed May 10, 1960
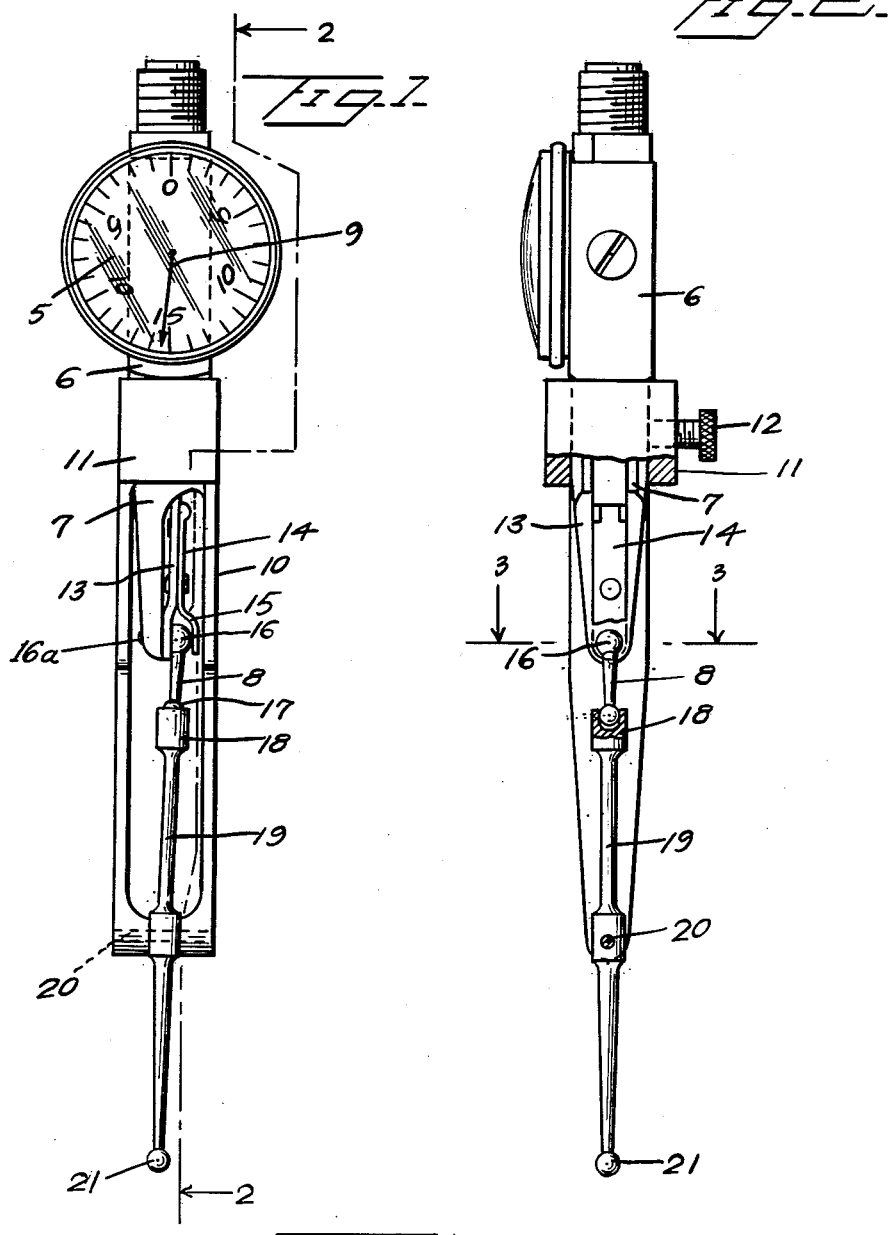
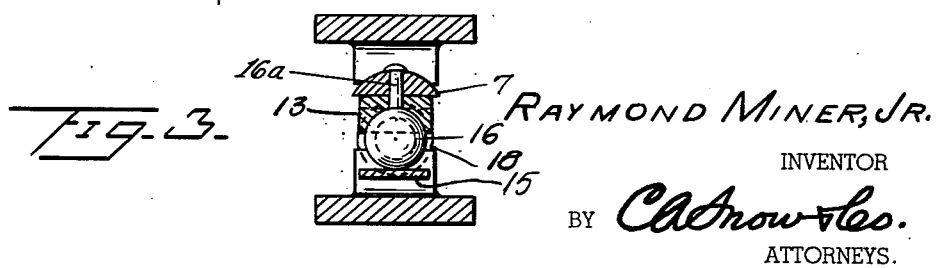
RAYMOND MINER, JR.
INVENTOR

United States Patent Office 3,079,693
Patented Mar. 5, 1963

3,079,693
DIAL INDICATOR EXTENSION ATTACHMENT
Raymond Miner, Jr., 817 W. Mossman, Tucson, Ariz.
Filed May 10, 1960, Ser. No. 28,083
3 Claims. (Cl. 33—172)

This invention relates to a dial indicator, and aims to provide an extension which may be readily and easily attached to the needle of the instrument, so that the indicator may be accurately employed in checking the diameter and accuracy of bores or places impossible to check with an indicator needle of the conventional type, and length.

An important object of the invention is to provide an attachment which may be slid into position over the indicator needle and secured against accidental displacement while in use, and at the same time permit movement of the extension arm which transfers movement to the indicator dial, to accomplish the purpose of the instrument.

Still another object of the invention is to provide an attachment which may be slid into position over the stem of the indicator needle and secured in place, insuring the correct location of the extension attachment, maintaining the accuracy of the indicator.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

FIGURE 1 is a front elevational view of a dial indicator equipped with an extension, constructed in accordance with the invention.

FIGURE 2 is a sectional view taken on line 2—2 of FIGURE 1.

FIGURE 3 is a sectional view taken on line 3—3 of FIGURE 2.

Referring to the drawing, the reference character 5 indicates an indicator dial which is secured to the body portion 6 of the indicator, the body portion including a hollow stem 7 in which the needle 8 pivots, the needle operating the indicating hand 9 when the needle is pivoted, the needle being returned in the conventional manner, by means of a spring mounted within the body portion, not shown.

The extension forming the subject matter of the present invention, is indicated generally by the reference character 10, the body having a sleeve 11 formed at one end thereof, the sleeve being provided with a threaded bore in which the securing screw 12 is mounted and is adapted to contact the outer surface of the body portion 6, securing the attachment in place on the hollow stem 7.

The needle mounting assembly includes a bar 13 to which a flat spring 14 is secured, the bar 13 and offset end 15 of the flat spring 14, providing means for fixedly clamping the ball 16 formed at one end of the needle 8, in position for pivotal movement of the bar about pivot 16a (see FIG. 3).

The other end of the needle 8 is formed with a ball 17 that is designed to move into a socket 18 formed at one end of the extension arm 19 that is pivotally mounted on the pivot pin 20 that extends transversely through the lower end of the body of the attachment.

The other end of the extension arm 19 is formed with a ball 21 which contacts the work being gauged.

It might be here stated that the socket, pivot point and ball 21 are arranged along the longitudinal axis of the extension arm to insure accuracy in the operation of the instrument.

In the use of the device, when th edevice is used to gauge the wall surface or diameter of deep bores which cannot be contacted with the needle of the conventional indicator, the attachment is positioned over the body portion of the indicator, in a manner as shown by FIGURE 2 of the drawing.

The socket 18 of the extension arm 19, is positioned to receive the ball 17 of the indicator needle, connecting the needle of the attachment to the conventional needle of the indicator but permitting the needle of the attachment to pivot as the conventional needle of the indicator is pivoted.

Since the socket 18 is slightly deeper than the diameter of the ball 17, it will be seen that a space is provided between the ball and bottom of the socket with the result that the extension needle may move in the arc of a circle to accurately operate the indicating needle of the instrument.

Thus it will be seen that with the use of the attachment, it will be possible to accomplish the gauging of the side walls of bores of considerable depth, accurately and conveniently.

In view of the foregoing detailed description and drawing, it is believed that further description as to the construction and operation of the device is unnecessary.

Having thus described the invention what is claimed is:

1. The combination with a dial indicator comprising a body having a pivoted bar and a needle point clamped to said pivoted bar, said needle point having a ball on its free end, of a needle extension comprising an elongated open sided body positioned over said pivoted bar of the indicator, an elongated needle arm pivotally mounted intermediate its ends at one end of said elongated body of the attachment and swingable within said open body, said elongated needle arm having a socket at one end thereof in which said ball of the needle point of the indicator is pivotally he'd, and a ball on the other end of said elongated needle arm for contact with the work being gauged.

2. The combination with a dial indicator comprising a dial body having a pivoted bar and a needle point having a ball on each end thereof, said needle point clamped at one end to said pivoted bar, of a needle extension comprising an open sided body, a sleeve at one end of said body for positioning over said dial body, an elongated extension needle pivotally mounted intermediate its ends within one end of said open sided body, said extension needle having an enlargement on one end thereof formed with a socket in which a ball end of said needle point is pivotally held, and the free end of said extension needle extending a substantial distance beyond the end of said extension needle body, for contact with the work being gauged.

3. The combination with a dial indicator comprising a dial body having a pivoted bar, and a needle point clamped to said pivoted bar, of a needle extension comprising an open sided body, a sleeve at one end of said open sided body for positioning over said dial body removably securing the said extension body to said dial body, an elongated extension needle pivotally mounted intermediate its ends within one end of said open sided body, a universal connection between the end of said needle extension and needle point, and the free end of said extension needle extending a substantial distance beyond the end of said extension body for contact with the work being gauged.

References Cited in the file of this patent

UNITED STATES PATENTS

| | | |
|---|---|---|
| 1,757,313 | Kaufman | May 6, 1930 |
| 2,728,992 | Frey | Jan. 3, 1956 |
| 2,731,726 | Timpner | Jan. 24, 1956 |
| 2,911,726 | Zelnick | Nov. 10, 1959 |